United States Patent [19]
Han et al.

[11] Patent Number: 6,068,301
[45] Date of Patent: May 30, 2000

[54] METHOD AND APPARATUS FOR IMPEDING THE COUNTERFEITING OF CARDS, INSTRUMENTS AND DOCUMENTS

[76] Inventors: Wenyu Han, 5C Marten Rd., Princeton, N.J. 08540; Victor Zazzu, 22 Monroe Ave., Belle Mead, N.J. 08502

[21] Appl. No.: 09/084,844

[22] Filed: May 26, 1998

[51] Int. Cl.[7] .......................... B42D 15/00; G06K 19/00; G06K 7/08; G06F 7/08
[52] U.S. Cl. .......................... 283/82; 283/72; 235/379; 235/380; 340/825.34
[58] Field of Search .................. 283/72, 82; 235/379, 235/380; 340/825.34

[56] References Cited

U.S. PATENT DOCUMENTS

| | | | |
|---|---|---|---|
| 3,676,644 | 7/1972 | Vaccaro et al. | 283/82 |
| 4,507,550 | 3/1985 | Fleer | 283/82 |
| 4,621,188 | 11/1986 | Stockburger et al. | 283/83 |
| 4,630,845 | 12/1986 | Sanner | 283/82 |
| 5,319,476 | 6/1994 | Yamazaki et al. | 283/904 |
| 5,559,885 | 9/1996 | Drexler et al. | 235/379 |

*Primary Examiner*—Willmon Fridie, Jr.
*Assistant Examiner*—Mark T. Henderson

[57] ABSTRACT

To impede the counterfeiting of a valuable instrument (e.g., a cash card, negotiable instrument or any document), an issuance mark is formed on the instrument at a programmed distance from a reference mark located on the instrument. The information pertaining to the distance is encoded and written onto a storage medium located in the instrument. In a particular system embodying the invention, a card vending machine is programmed to encode cards with various parameters, such as the distance between the reference and issuance marks, by writing the parametric information into an information storage medium located in the card. As a corollary, in a particular system embodying the invention, a dispensing machine is programmed to read the information stored in the information storage medium and the parametric information present in the card and to then compare the stored information with the values of the actual parameters present in the card.

25 Claims, 5 Drawing Sheets

METHOD AND APPARATUS FOR IMPEDING THE COUNTERFEITING OF CARDS, INSTRUMENTS AND DOCUMENTS

BACKGROUND OF THE INVENTION

This invention relates to valuable cards, instruments and documents and, in particular, to a method and apparatus for preventing the counterfeiting and falsification of these cards, instruments and documents.

For ease of discussion, the invention will be illustrated using cards, such as debit cards (or cash value cards) which are issued to individuals in payment of a certain sum of money. These debit cards are also referred to as cash value cards or cash cards since they may be redeemed for cash or the equivalent in goods and/or services. In fact, a card holder uses the card when making withdrawals at a money dispensing or card acceptance machine. By way of example, as shown in FIG. 8A, a person may insert cash ($) into a card vending machine 95 and the card vending machine will issue a debit or cash value card 100. Subsequently, as shown in FIG. 8B, the purchaser of the card can insert the card 100 into a cash dispensing (card accepting) machine 97 to withdraw all or part of the cash value of the card 100.

In one application, each time the card holder makes a withdrawal, a hole is punched through the card to indicate the amount of the withdrawal. For example, assume that a card issued for payment of $2,000.00 has a value of $2,000.00 and that the $2000.00 card is arranged to have 20 units with each unit representing a value of $100.00. A card holder may then make partial cash withdrawals (receive payment) in units of $100.00, or the card holder may receive goods (e.g., tokens, chips, balls) or services meted out in units of $100.00. For each unit (e.g., $100.00) withdrawn, a hole is punched in the card to indicate that the value of the card has been decreased by one unit (e.g., $100.00). If a card has a value of 20 units, there can be a maximum of 20 unit holes punched in the card to indicate that the entire value of the card has been used up.

By way of example, a card 100 is shown in FIG. 1. The card has a strip 102 along which holes may be punched. Typically, as shown in FIG. 1, an issuance hole 1A is punched into the card by the card vending machine 95 at the time of the issuance of the card so as to validate the card. Subsequently, 20 additional holes (2–21) may be punched into the card by the cash dispensing machine 97 each time a withdrawal is made. Hole number 2 is punched into the card after the first unit value is used up (e.g., $100.00 is withdrawn). Subsequently, hole number 3 is punched into the card after the second unit value is used up (e.g., another $100.00 is withdrawn), and so on. Thus, if the card holder used up the 20 units of value on the card by making 20 individual withdrawals, there would be a hole at each of twenty positions, plus an additional card issuance hole for a total of twenty one holes. In some prior art applications, if the card purchaser used up two units at a single transaction, there would be a single hole at the two unit position. Likewise, if the card used up twenty units in a single transaction, there would be a single hole at the 20 unit position. In any event, in accordance with the prior art, one or more holes are punched into a cash card until all the holes are punched or until the last hole (unit 20) is punched.

A problem with the above scheme is that it is possible to falsify the value of the card by simply filling in the holes of the cards using an opaque material. After the holes in the card have been filled up, the counterfeiter (thief) can reuse the card as if it were new and make cash (or the equivalent) withdrawals for the full value of the underlying card. The counterfeiter can then reuse the card an indefinite number of times.

It is known to deter the efforts of a counterfeiter (or falsifier) by manufacturing the cash cards 100 with a hologram stripe 101 on which is formed a holographic type of image in the same plane as the one in which the holes are to be punched, as shown in FIG. 2. For such cards, the holes simply cannot be filled up by conventional methods to fool a dispensing machine. If there is a hole in the holographic image, it becomes very difficult, if not impossible, for a counterfeiter to fill up the hologram image without using some very expensive methods. Nevertheless, it is still possible for a counterfeiter to reuse a canceled card by cutting off a portion of the top of the hologram stripe (e.g., section 101A) above the holes; and then pasting the portion of the hologram stripe (101A) on the portion (101B) of a previously canceled card so that the holes are covered. Alternatively, a counterfeiter may produce a false hologram to place over a strip 101 even though its placement in an appropriate manner so as to fool a dispensing machine presents a significant problem. In either method, the counterfeiting process is then normally completed by punching an issuance hole in the first position (i.e., the card issuance position).

An object of the invention is to make the falsification of the value of a cash card or the counterfeiting of such cards extremely difficult, if not impossible.

As noted above, the cash card is an example of a particular application of the invention. It is an object of the invention to impede the counterfeiting and/or falsification of any valuable instrument/card/document. Therefore, note that in the discussion to follow and in the appended claims, when the term "instrument" is used without limitation, it is intended that the term "card" or "document" be included and vice-versa.

SUMMARY OF THE INVENTION

In systems embodying the invention, a card, instrument or document is encoded with first and second marks with the distance between the first mark and the second mark being programmable, such that the distance between the first mark and the second mark may be different for different cards (instruments or documents). The first mark may be a reference mark and the second mark may be an issuance mark. In the discussion to follow, the issuance mark used in the embodiments is an "issuance hole". However, it should be understood that, in practicing the invention, any suitable "issuance mark" may be used instead of an issuance hole.

In some embodiments, the location of the issuance hole may be selected to be placed anywhere on a card. In other embodiments, the location of the issuance hole may be any one of "N" possible hole locations located along a row or strip of a card; where N may be any integer greater than one.

The reference mark may be any number of different indicia and may be formed such that different points, or parts, of the reference mark may be used as the reference point to measure the distance to the issuance hole.

In certain embodiments, the reference mark is a hologram. In other embodiments, the reference mark is a bar code image (which may be visible or invisible to the naked eye). In still other embodiments, the reference mark may be a graphic image. In still other embodiments, the reference mark may be a "reference" hole.

In certain embodiments of the invention, the cash cards include a magnetic strip on which is written encoded information pertaining to the relationship between the reference mark and the issuance hole.

In systems embodying the invention a card vending machine may be programmed to locate (or form) a reference mark on a card and to form an issuance mark on the card at different distances relative to the reference mark. The information relating to the distance is encoded (encrypted) and stored in an information storage medium (e.g., a magnetic stripe) located on the card.

Subsequently, a user may use the card containing the reference and issuance marks to obtain either cash, goods or services from a dispensing machine programmed to read and decode the information stored in the storage medium.

BRIEF DESCRIPTION OF THE DRAWINGS

In the accompanying drawings, like reference characters denote like components.

DESCRIPTION OF THE INVENTION

In order to counter attempts to counterfeit or falsify the value of a debit card (cash card), applicants developed a system to render attempts to counterfeit or falsify the debit cards extremely difficult and/or inordinately expensive, if not impossible.

Figure 9A:
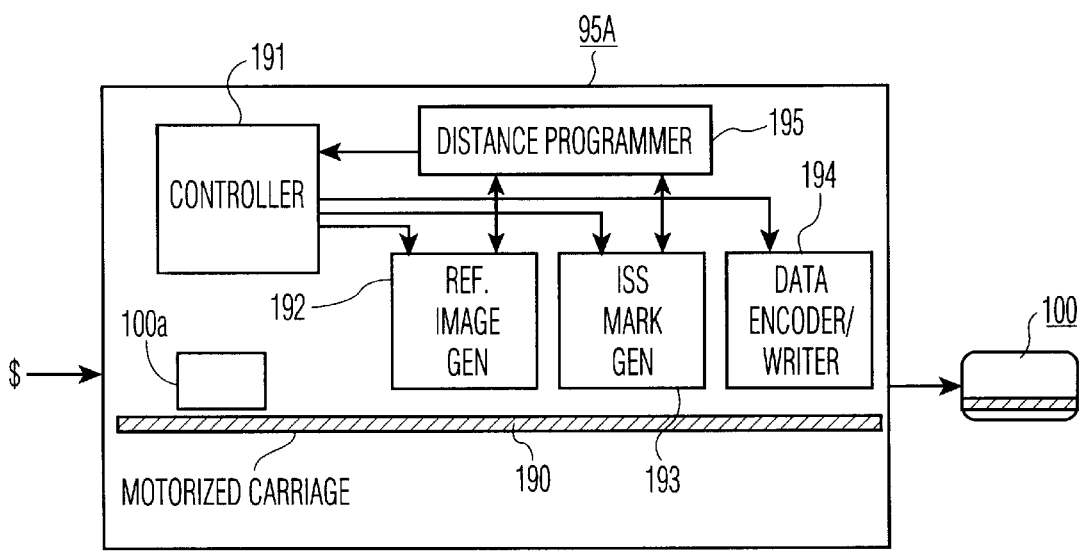
FIG. 9A is a simplified block diagram of a portion of a card vending machine modified in accordance with the invention.

In order to produce cards in accordance with the invention, the prior art vending machine may be modified as shown in FIG. 9A. Thus, in FIG. 9A, a "blank" card (a card to be annotated) 100a is propagated along a motorized carriage 190 through the machine 95A. The machine includes a microcontroller 191 which supplies critical signals to a reference image (mark) generator 192, an issuance mark generator 193 and a data encoder and writer 194. Under the control of controller 191, the reference mark generator 192 places a reference mark, whose shape may also be controlled and programmably altered, onto the card. The issuance mark generator 193 then places an issuance mark on the card of a shape and at a location programmably controlled by controller 191. The distance "d" between the reference mark, or an arbitrary point on the reference mark, and the issuance mark is then determined by the controller 191. The controller 191 includes, in combination with a data encoder and writer 194, means for encoding the data and then writing the encoded information onto the card.

In accordance with the invention, the controller 191 may be programmed to vary the shape and location of the reference mark. Likewise, the controller 191 may be programmed to vary the location of the issuance mark relative to the reference mark. The spacing (distance) between the reference and issuance marks may be sensed by the distance programmer 195 coupled to the controller 191 which then decodes the information and supplies it to data writer 194. The controller may also be programmed to vary the shape of the reference mark to further increase the difficulty of counterfeiting the mark. The reference and/or issuance marks may be: holes punched in the card; graphic symbols engraved or burned into the card; holographic images; or any other indicia which is machine readable or which may be rendered machine readable.

Figure 9B:
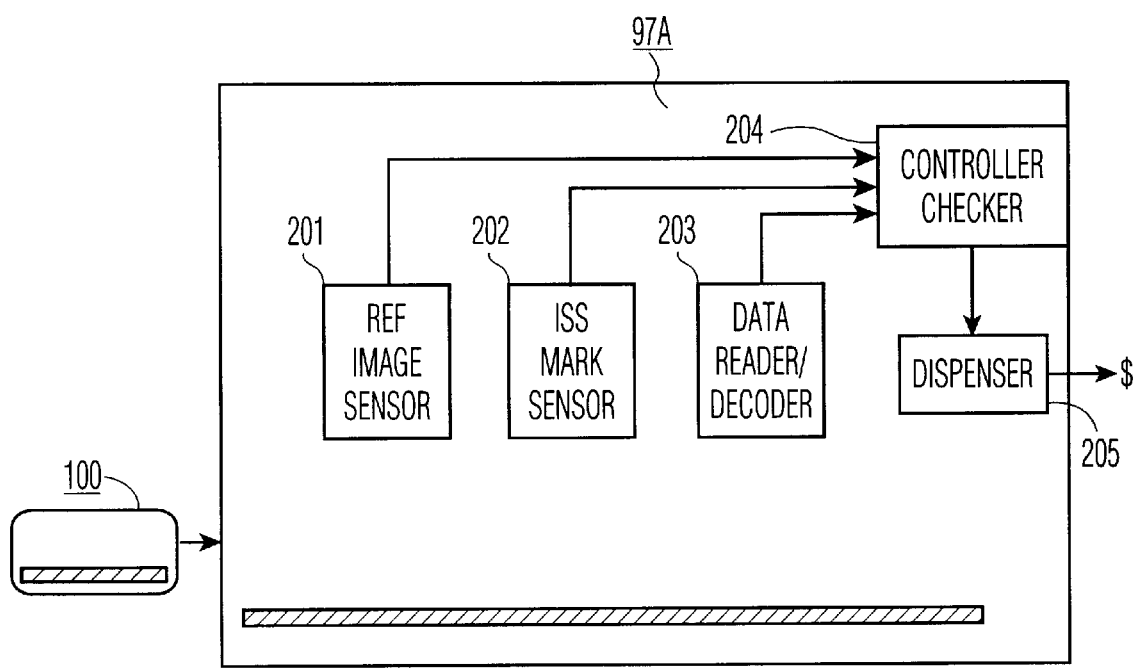
FIG. 9B is a simplified block diagram of a portion of a vending machine modified in accordance with the invention.

In order to read or sense the cards embodying the invention, the dispensing (card accepting) machine may be modified as shown in FIG. 9B. As shown in FIG. 9B, the dispensing machine 97A includes a sensor 201 to sense the reference mark location, a sensor 202 to sense the location of the issuance mark and a data reader (decoder) 203. Sensors 201 and 202, and reader/decoder 203 are coupled to a controller/checker 204. Typically, when a card is inserted into dispenser 97A, the reader/decoder 203 reads (senses) the stored information written in a magnetic strip (or other storage medium) located on the card. This information is decoded and the controller 204 is provided with the information about the shapes of the reference and issuance marks and the distance between these marks. The reference mark sensor 201 senses information regarding the location and shape of the reference mark which it senses and feeds this information to the controller. Likewise, the issuance mark sensor 202 senses information regarding the location and shape of the issuance mark which it sees and feeds this information to the controller 204. The controller 204 evaluates the information received from sensors 201, 202 and 203 and compares the received information to the information received from reader/decoder 203. If the information matches, controller/checker 204 signals the dispenser to issue cash, goods or services. If the information does not match, controller/checker 204 will send an alarm indicative of the presence of a false card.

Figure 1:
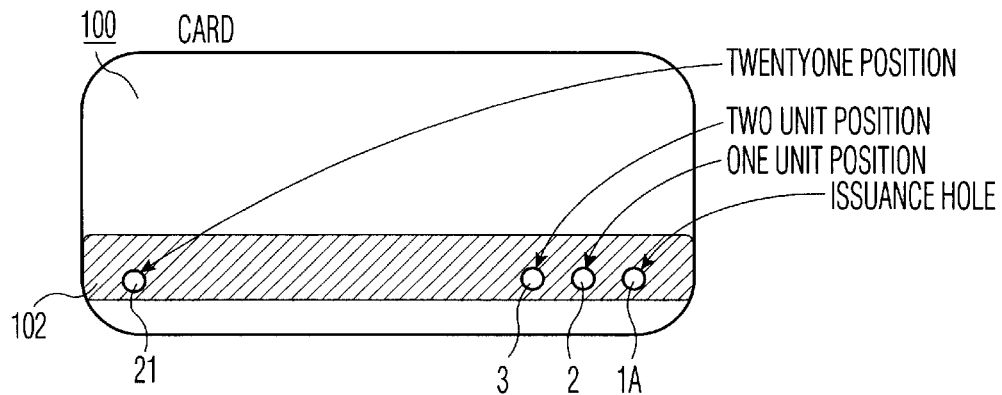
FIG. 1 illustrates one side of a cash (value) card.
Figure 2:
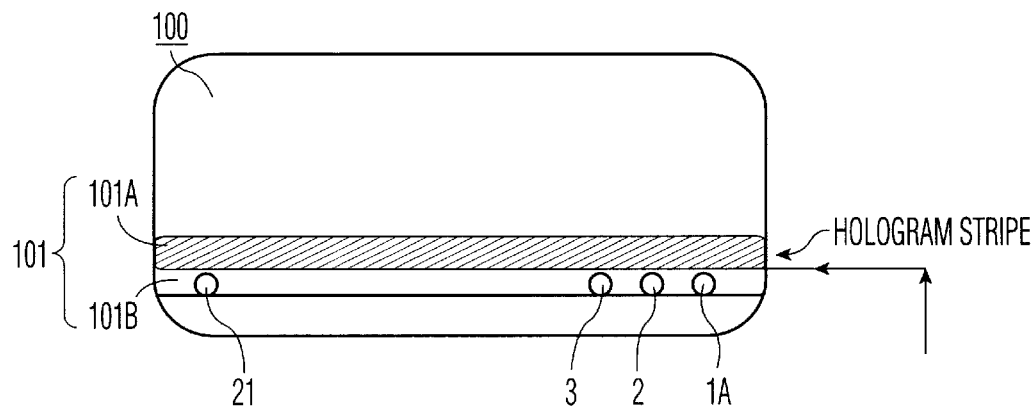
FIG. 2 shows the one side of a cash card with a hologram stripe and a row of punched holes.

In accordance with one embodiment of the invention, the location of the issuance hole is programmed to be placed in any one of N predetermined positions on a card such as shown in FIGS. 1 and 2, where the N holes will be punched along the strip 102 or 101 and N is any integer greater than one. For example, there may be 20 possible locations for punching cancellation holes in the card and one location for punching the card issuance hole. That is, in accordance with the invention, a card vending machine such as 95A in FIG. 9A may be programmed to locate the issuance hole in any one of 21 possible positions. The location of the issuance hole is then encoded (encrypted) by the vending machine and then written (stored) by the machine onto a magnetic stripe (see FIG. 6) or any suitable storage medium located on the card, as shown, for example, in FIG. 6A discussed below. Therefore, for the example of a card with 20 possible hole locations and one issuance hole location, the card issuance hole may be located in any one of twenty one positions. This reduces the odds of a counterfeiter getting the issuance hole in the correct position to 1 in 21.

In accordance with another embodiment of the invention, in the manufacturing of the debit cards, there is a holostripe placed on the cards as shown in FIG. 2. Contained within this holostripe is an image that is detectable by machine readable means. Since the cards are made on a mass production basis, it is difficult for the card manufacturer to accurately register the edge of the holostripe to the card edge. An aspect of the present invention is to use the inherent randomness of the manufacturing process in which the holostripe is randomly placed on the card to effectively deter any attempts to counterfeit the card. Since the holographic image located in the holostripe has a finite size and a definite start of image characteristic, the random location of the hologram image is used to calculate and to then store on the card the information pertaining to the location of the card issuance hole.

Figure 3:
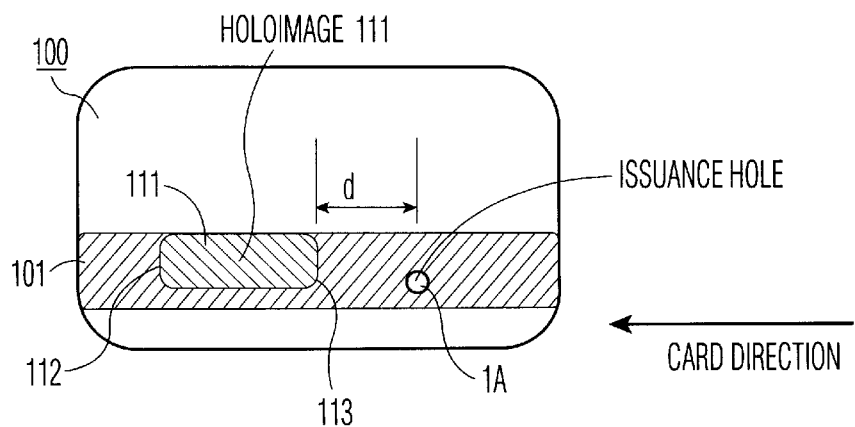
FIG. 3 shows the one side of a cash card with a holographic image formed within the hologram stripe.

FIG. 3 shows a holographic image (holoimage) 111 and an issuance hole 1A located a distance "d" from the back edge 113 of holoimage 111. At the time the card is issued to a purchaser, it is passed through a vending machine 95A, as shown in FIG. 9A, which includes a motorized carriage for moving the card through a reader (or like sensor) at a constant speed. During this operation, the vending machine 95A, modified in accordance with the invention, includes sensing and logic circuitry and the appropriate software to very accurately calculate the distance "d" between the beginning (or some other predetermined point) of the holographic image 111 and the location where the issuance hole is punched (which can be located in any one of N, e.g., 21, positions). The distance measurement is then written (encoded) together with additional information onto the magnetic stripe (or any other suitable storage medium) located on the card for future verification. If the counterfeiter cuts a stripe from an existing card and attempts to cover the existing holes on a previously canceled card, it will be impossible for the counterfeiter to exactly duplicate the holoimage position. If the new stripe is positioned such that the issuance hole of the "falsified" card is at a distance other than "d" from the selected point on the reference mark, the accurate measurement calculations between the image 111 and the issuance hole 1A will not match the condition set by the vending machine issuing the card. In addition, where the issuance hole is algorithmically defined to be one of N (e.g., 21 or more) locations, it is very difficult to identify which hole is the issuance hole.

Figure 4:
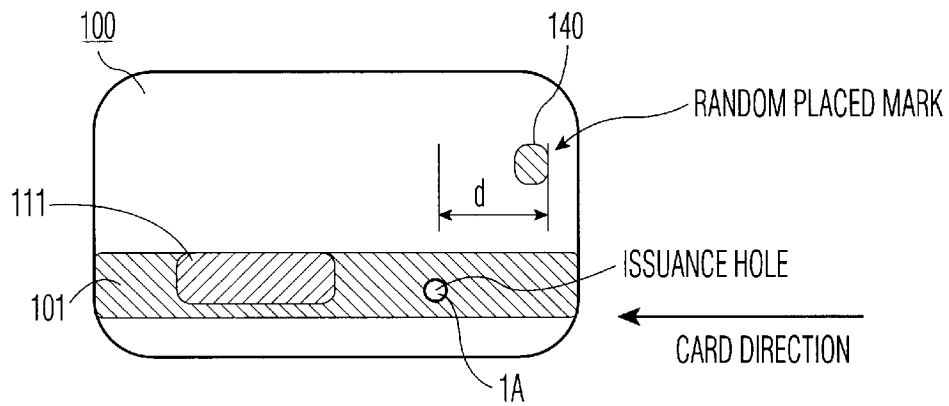
FIG. 4 illustrates one side of a cash card with a reference mark used to define the location of an issuance hole.

In still another embodiment of the invention, as shown in FIG. 4, the issuance hole 1A is located at a distance "d" from a random indicator mark 140, which may be a hole punched into the card or any other suitable marker or indicia. Mark 140 is a reference mark which may be a randomly placed mark or a random indicator mark, in that it may be place at virtually any selected (random) location on the card. In this instance, no reliance is made on the holographic image 111 or stripe to locate the issuance hole 1A.

Figure 6:
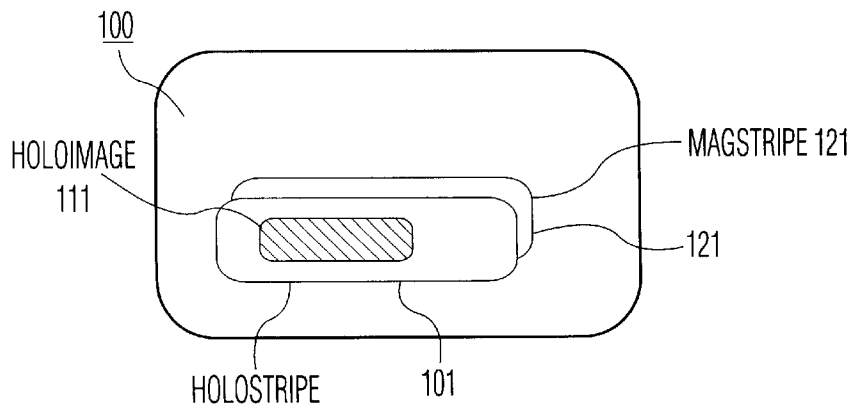
FIG. 6 illustrates one side of a cash card on which is formed a holostripe on top of a magnetic stripe.
Figure 6A:
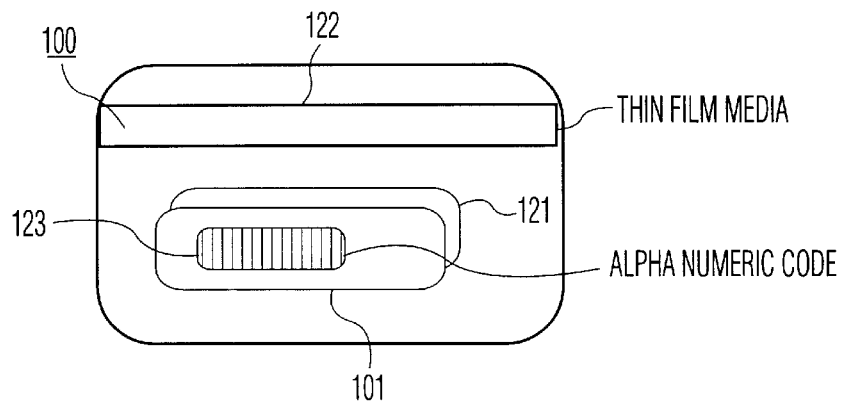
FIG. 6A illustrates the use of different storage mediums on a card.

In systems embodying the invention, information pertaining to the distance "d" between a reference mark and an issuance mark is stored in a storage medium located on the card, as shown, for example, in FIGS. 6 and 6A. Also, any pertinent parameters and information regarding the reference mark and/or the issuance mark may be stored in the information storage medium. In FIG. 6, the information storage medium is a magnetic stripe. As shown in FIG. 6, cards embodying the invention may include a holostripe 101 containing a holoimage 111 and a magnetic stripe 121. The magnetic stripe may be formed immediately below the holostripe or it may be formed adjacent to the holostripe, on the same side of the card, or the magnetic stripe may be formed on the side of the card opposite to the side on which the holostripe is formed. In FIG. 6A, the storage medium is a thin film 122 on which may be formed semiconductor devices to electronically store information. Another information storage medium, shown in FIG. 6A, is a strip 123 on which may be printed an alphanumeric code. It should be noted that the dispensing machines 97A will include reading systems capable of reading the information stored in the cards.

As part of the system to make the cards more secure (i.e., more difficult to falsify or counterfeit) information is encoded (written in code) on the magnetic stripe. For example, when one card is issued from vending machine 95A, the distance "d" in FIGS. 3, 4 or 5 may have a first value (e.g., 0.5 inches) for one card. This value (information) is encrypted in the magnetic stripe of that card. When another card is issued by the card dispensing machine, the distance "d" in FIGS. 3, 4 and 5 may have a second value (e.g., 0.6 inches). By varying the distance "d", the location of the issuance hole has been "randomized". Furthermore, its location on the card can only be determined by ascertaining which "indicium" or "marker" the issuance hole is referenced to. In FIG. 3, the issuance hole is referenced to some point associated with holographic image 111. That point, for example, may be the beginning or the end or some intermediate bar of holographic image 111.

In FIG. 4, the random mark 140 may be, for example, a hole or an image of some animal or fruit. If an animal, such as a horse with 4 legs is used, the distance "d" may be referenced to any one of the 4 legs of the horse or to any other suitable point on the animal.

Figure 5:
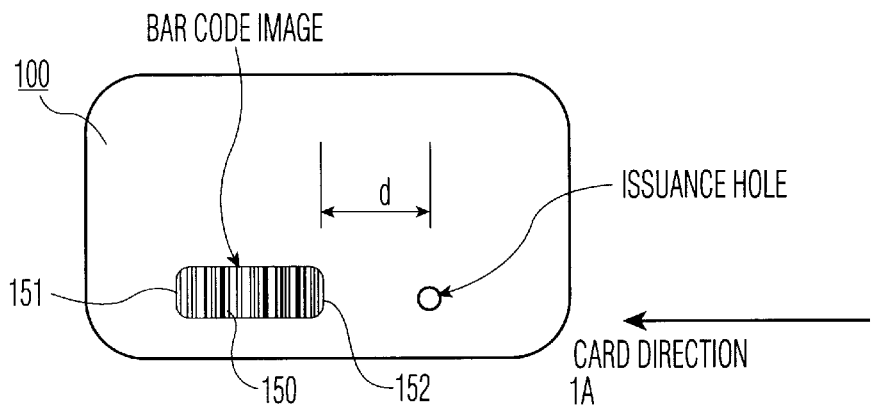
FIG. 5 illustrates one side of a cash card with a bar code used to define the location of an issuance hole.

Likewise, in FIG. 5, the issuance hole is referenced to a bar code image 150. The location of the issuance hole may be located at a distance "d" relative to any one of a number of different bars of the bar code. The distance "d" may vary and the bar or space on the bar code being used as a reference may vary. Thus, a counterfeiter or falsifier of a card must be able to solve these additional problems in order to reuse a canceled card (or a partially used card) or to produce another card which when inserted into a dispensing machine 95B will be recognized as a valid card.

Applicants' invention is also applicable to instances where a counterfeiter becomes able to "exactly" duplicate debit cards. This can conceivably occur where a counterfeiter stole a debit card vending machine. Such machine would include a "correct" or valid hole punching algorithm. Accordingly, the cards dispensed from a stolen vending machine would contain the correct hole punching algorithms and would pass the security system outline. To counter this problem, each vending machine 95A may be manufactured with a unique electronic serial number. That serial number will be written to the storage medium (e.g., magnetic portion) of the card. However, once the theft of the "valid" machine is detected, the serial number of a stolen machine can then be electronically downloaded to all of the cash dispensing machines. The cash dispensing machines will then cross-check the vending serial number against the downloaded information to prevent pay out on a "counterfeit" card.

Figure 7:
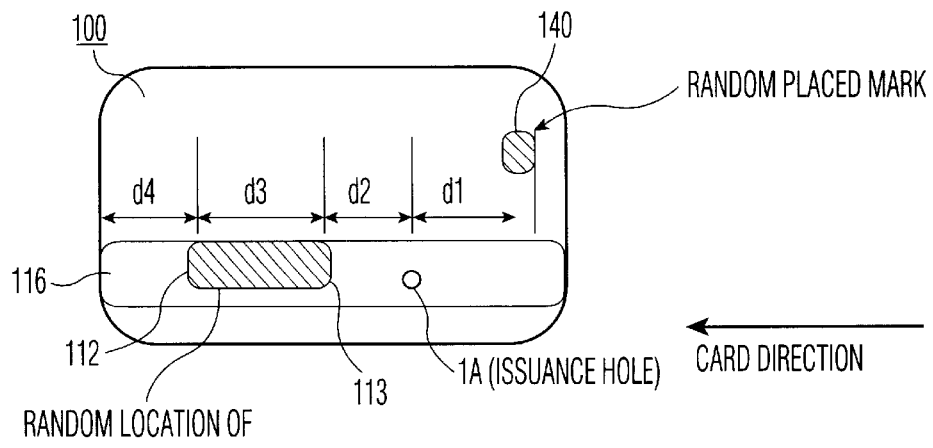
FIG. 7 illustrates one side of a cash card and different points which may be used to locate the issuance hole.
Figure 8A:
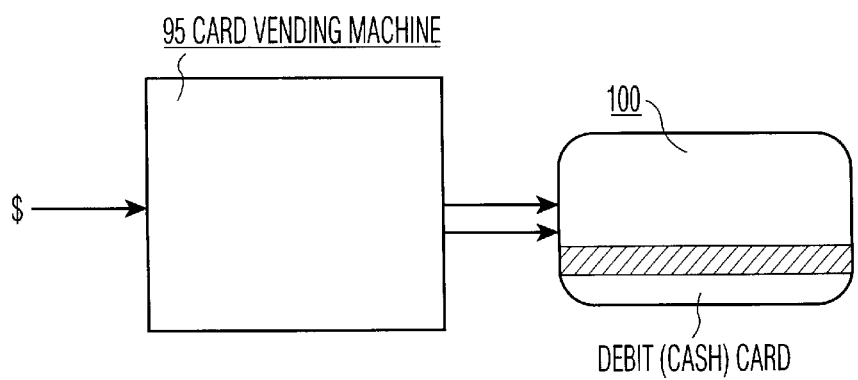
FIG. 8A is a very basic block diagram of a card vending (card producing) machine.
Figure 8B:
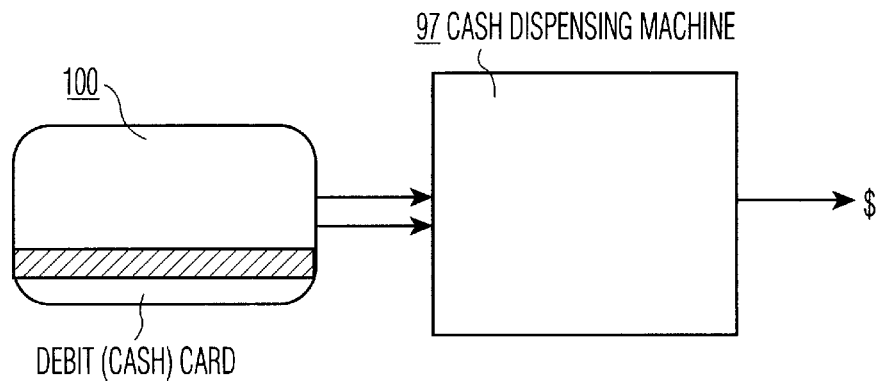
FIG. 8B is a very basic block diagram of a cash dispensing (card accepting) machine.

FIG. 7 is designed to illustrate that the distance measurements from the issuance hole 1A may be referenced to either one of the following points:

(a) the front edge of the card 116 (distances d3+d2+d4); or (b) the front edge 112 of the holographic image 111 (distances d3+d2); or (c) the back edge 113 of the holographic image 111 (distance d3); or (d) any intermediate point along the hologram; or (e) the randomly placed mark or hole 140 (distance d1); or (f) any permutation or combination of distances d1, d2, d3 and d4.

The card vending machine 95A is programmed to determine which one of the measurements (or the combination of measurements), shown in FIG. 7, are used to define the issuance hole and the reference mark. The card vending machine is also programmed to code the information and to generate a cryptogram containing the information. The encrypted (encoded) information is then written into and/or onto the magnetic stripe (or any other storage medium located on the card) and the issuance hole is punched on the card.

Card vending machine 95A includes a carriage driven by a motor to advance the card along a path. The gear rotation of the motor may be used to determine the distances between the reference and the issuance marks. Alternatively, vending machine 95A may include an electronic timer (not shown) or any other suitable system which can be used to determine the various distances.

Cards, which may be of the plastic type in common use, have been used by way of example to illustrate the application of the invention. It should be appreciated that the invention may be used with other materials such as specially treated paper (similar to travelers checks or any like negotiable instrument) or any document (e.g., a passport). Therefore, in the appended claims reference to an instrument is intended to mean any item of manufacture or any document (e.g., a passport) suitable for the placing thereon of a (e.g., first) reference mark and an issuance (e.g., second) mark in accordance with the invention.

As noted above the issuance hole is used by way of example and any "issuance mark" may be used. That is, the issuance mark may be formed by a laser beam or by a heating element or by any other suitable means to indicate, or form, an issuance mark (e.g., second mark) at a programmable distance from a reference mark (e.g., first mark) and which "issuance mark" can be read or sensed by a suitable electronic or electro-optic sensor.

Regarding the reference mark, a "blank" card may come formed or prepared with a reference mark, in which case, the "vending" machine would first identify its location before forming an issuance mark. Alternatively, if a blank card does not contain a reference mark, the vending machine will form and locate a reference mark by using the reference mark generator as discussed above.

The invention has been illustrated using a "reference mark" and an "issuance" mark. However, it should be appreciated that any "first" and "second" marks may be used.

What is claimed is:

1. An instrument comprising:
   a first mark located on the surface of said instrument; wherein said first mark is a reference hole punched into said instrument;
   a second mark formed on said instrument at a programmably selected distance "d" from said first mark, said second mark being located at any one of a plurality of different possible locations on the surface area of said instrument; and
   an information storage medium located on said instrument for storing encoded information pertaining to the distance "d" between said first and second marks.

2. An instrument as claimed in claim 1 wherein said information storage medium is a magnetic stripe.

3. An instrument as claimed in claim 1 wherein said information storage medium is an electronic storage device.

4. An instrument as claimed in claim 1 wherein said information storage medium includes encoded data printed on said instrument.

5. An instrument as claimed in claim 1 wherein at least one of said first and second marks is a holographic image.

6. An instrument as claimed in claim 1 wherein at least one of said first and second marks includes a machine readable image.

7. An instrument as claimed in claim 1 wherein at least one of said first and second marks includes a bar code.

8. An instrument as claimed in claim 7 wherein at least one of said first and second marks is invisible to the naked eye.

9. An instrument as claimed in claim 1 wherein said first mark is a reference mark and said second mark is an issuance mark.

10. The invention as claimed in claim 9 wherein said instrument is a card.

11. The invention as claimed in claim 10 wherein said card is a cash value card and wherein at least one of said reference and issuance marks is a hole punched into the card.

12. The invention as claimed in claim 10 wherein the information storage medium located on said card is a magnetic stripe.

13. A card including:
   a reference mark located on said card; wherein said reference mark includes a reference hole punched in said card;
   an issuance mark located on said card at a programmably selected distance "d" from said reference mark, said reference mark and said issuance mark being located at any of a plurality of different possible locations present on and within the surface area of said card; and
   an information storage medium located on said card for storing encoded information pertaining to the distance "d" between said reference and issuance marks.

14. A card as claimed in claim 13 wherein said information storage medium is a magnetic stripe.

15. A card as claimed in claim 13 wherein at least one of said reference and issuance marks is a holographic image.

16. A card as claimed in claim 13 wherein at least one of said reference and issuance marks is a bar code.

17. A card as claimed in claim 13 wherein said bar code is invisible to the naked eye.

18. A card as claimed in claim 13 wherein said reference and issuance marks are machine readable.

19. An instrument as claimed in claim 1, wherein said first mark is randomly located at any selected location on the surface of said instrument; wherein said instrument includes a plurality of defined locations; and wherein said second mark may be selected to be located at any one of said plurality of locations.

20. An instrument as claimed in claim 19, wherein said first mark is a reference mark, wherein said second mark is an issuance mark, and wherein the remaining defined locations indicate a designated value of the instrument.

21. An instrument as claimed in claim 20, wherein said second mark is a issuance hole punched in said instrument.

22. An instrument as claimed in claim 1 wherein said instrument includes a plurality of defined locations and wherein said first mark may be any one of said plurality of locations and said second mark may be any other one of said plurality of locations.

23. An instrument as claimed in claim 1 wherein said storage medium includes semiconductor devices for electronically storing information.

24. An instrument as claimed in claim 1, wherein said information storage medium also stores information pertaining to the location of the first and second marks.

25. A card as claimed in claim 13 wherein said issuance mark is an issuance hole.

* * * * *